A. H. PIKLER.
POLYPHASE TRANSFORMER.
APPLICATION FILED NOV. 22, 1912.
1,183,588.
Patented May 16, 1916.
2 SHEETS—SHEET 2.
Fig. 2,
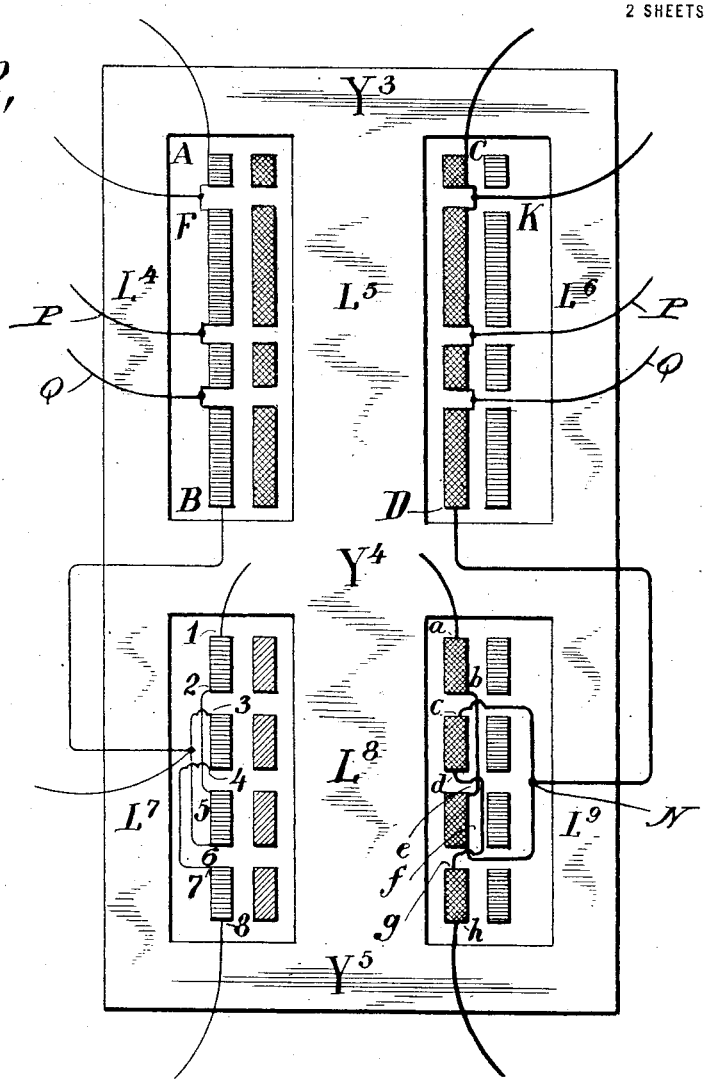
Fig. 3,
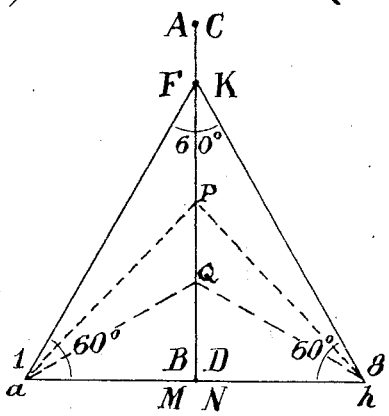
WITNESSES
Alfred E. Frost
Henry A. Jones
INVENTOR
Armin Henry Pikler
BY
Francis B. Crocker
ATTORNEY

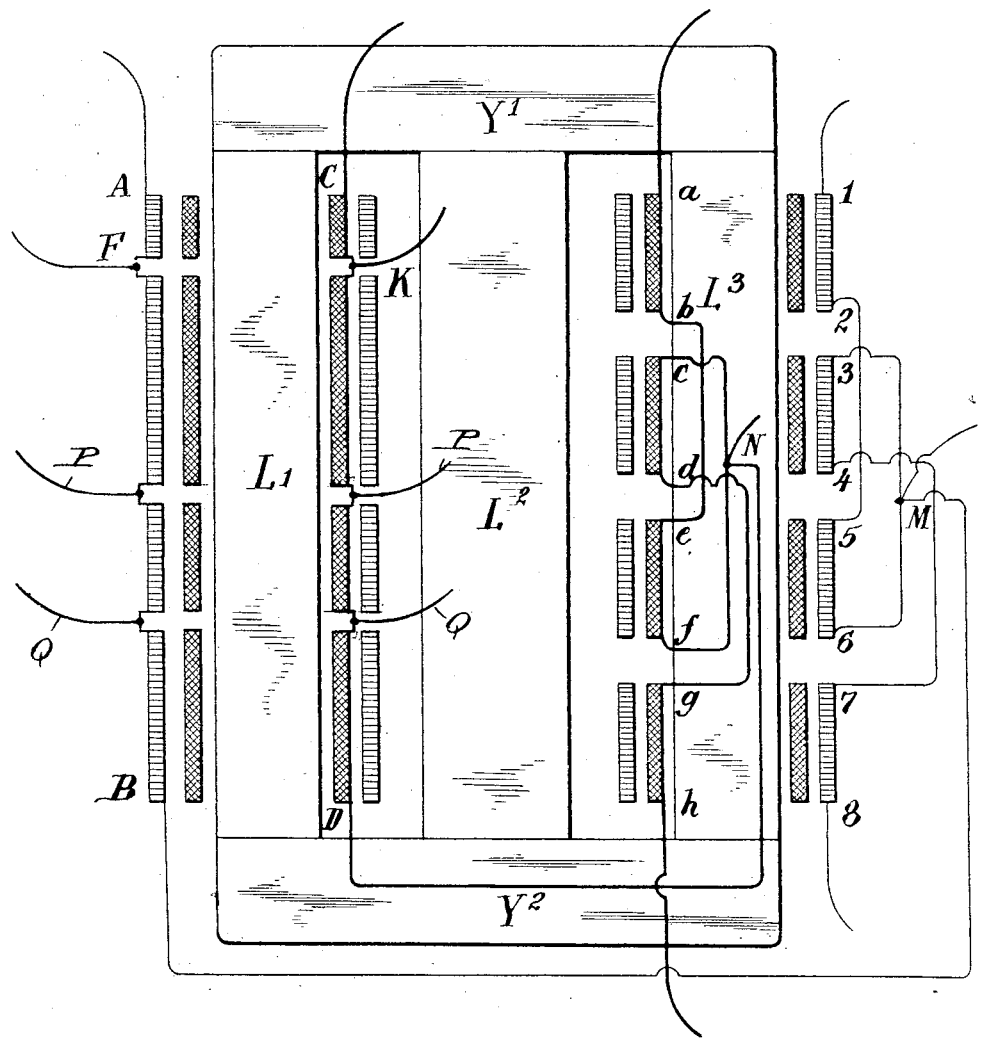

UNITED STATES PATENT OFFICE.

ARMIN HENRY PIKLER, OF MONTCLAIR, NEW JERSEY, ASSIGNOR TO CROCKER-WHEELER COMPANY, OF AMPERE, NEW JERSEY, A CORPORATION OF NEW JERSEY.

POLYPHASE TRANSFORMER.

1,183,588.   Specification of Letters Patent.   Patented May 16, 1916.

Application filed November 22, 1912. Serial No. 732,932.

*To all whom it may concern:*

Be it known that I, ARMIN HENRY PIKLER, a subject of the King of Hungary, and a resident of Montclair, county of Essex, and State of New Jersey, have invented certain new and useful Improvements in Polyphase Transformers, of which the following is a specification.

This invention relates particularly to transformers which are capable of distributing two-phase and three-phase energy simultaneously from either a two-phase or a three-phase system of electrical transmission.

If made in accordance with my invention the same transformer may be connected to the supply lines of a two phase system or a three phase system and the entire output or any portion thereof may be obtained as two-phase currents alone or as three-phase currents alone or partly as two-phase and partly as three-phase currents, in any proportions, as desired.

A most important advantage of my transformer is the fact that no matter what total or relative amounts of two-phase and three-phase power are delivered, and no matter how unequally the phases of each are loaded, the secondary voltages remain balanced. This statement assumes, of course, that the voltages of the supply circuit are properly balanced.

In the accompanying drawings which form part of this application, Figure 1 illustrates my invention as applied to a core-type transformer. Fig. 2 represents its application to a shell-type transformer. The relations between the phase and magnitude of the electrical and magnetic quantities are vectorially represented in Fig. 3.

In Fig. 1 the core of the transformer, made of suitable magnetic material, has three branches or legs, $L^1$, $L^2$ and $L^3$ and two yokes $Y^1$ and $Y^2$ connecting the former together. Two of these legs $L^1$ and $L^3$ are provided with windings, as indicated, but the leg $L^2$ serves only as the return circuit for the magnetic flux generated by the said windings when energized. On the leg $L^1$ there is a primary winding A B and a secondary winding C D. The leg $L^3$ has a primary winding the terminals of which are marked 1 and 8 and a secondary winding with terminals marked $a$ and $h$. The primary and secondary windings on the leg $L^1$ are respectively tapped at the points F and K as represented, so as to obtain between F and B also between K and D substantially 86.7 per cent. of the number of turns of these primary and secondary windings respectively. The primary and secondary windings on the leg $L^3$ are tapped at substantially their central points M and N respectively. In the case of the particular form of my transformer, illustrated in Fig. 1, the primary and secondary windings are each subdivided into four substantially equal portions. Between the points 1 and M is included one half and between the points M and 8 is included the other half of this primary winding. The two quarter portions of this winding between the points 1 and M are placed on opposite sides of the middle of the leg $L^3$, and the same is true of the two portions of this winding between M and 8. The arrangement of the parts of the secondary winding $a\ b$, $c\ d$, $e\ f$, and $g\ h$ corresponds to that of the primary winding 1 2, 3 4, 5 6 and 7 8, just described, as clearly shown. The terminal B of the primary winding on the leg $L^1$, is connected to the middle point M of the primary winding on leg $L^3$, as indicated. Correspondingly the terminal D of the secondary winding on leg $L^1$ is connected to the middle point N of the secondary winding on leg $L^3$, as also clearly shown in Fig. 1.

In order to operate my transformer, as represented in Fig. 1, the points F, 1 and 8 of the primary winding may be respectively connected to the supply lines of a three-phase transmission system. From the points K, $a$ and $h$ of the secondary winding three-phase energy can be distributed; also from the points C, N and $a$, $h$ two-phase energy can be distributed at the same time or at different times, as desired. By connecting the points A, B and 1, 8 respectively of the primary winding of this same transformer to the supply lines of a two-phase transmission system, it will distribute three-phase energy from the points K, $a$ and $h$, and two-phase energy from the points C, N and $a$, $h$, either simultaneously or not, as desired.

The intermingling of the various portions of the windings on leg $L^3$ has the effect of eliminating the unbalancing of the phases if they are unequally loaded. The two branches or legs $L^1$ and $L^3$ of the transformer core in Fig. 1 carry equal magnetic flux corresponding to the voltage and frequency impressed and to the number of turns in the windings. The leg $L^2$ forms the return magnetic circuit for the other two, the fluxes in which bear a quarter phase relation to each other, consequently the former carries the square root of 2 times the flux in the leg 1 or the leg $L^3$ and is therefore preferably of a cross section about 1.41 times greater than either of the latter.

In Fig. 2 my invention is illustrated as it may be applied to a shell type transformer. In the construction represented the windings are all placed on the central branches or legs $L^5$ and $L^8$ of the core, the outer legs $L^4$, $L^6$, $L^7$ and $L^9$ serving only to complete the magnetic circuits. Hence the four latter and the connecting yokes $Y^3$ and $Y^5$ each have a cross section about one half as great as that of either central leg $L^5$ or $L^8$, the flux from each of which divides in two equal portions. The yoke $Y^4$, however, may properly have a cross section only 1.41 times greater than either of the outer legs $L^4$, $L^6$, $L^7$ or $L^9$ because the component fluxes in the latter are in quarter phase relation. The windings in the case of my shell type transformer illustrated in Fig. 2 correspond to those of my core type transformer already described with reference to Fig. 1. These windings are similarly subdivided and connected internally. They may also be similarly connected to external primary and secondary circuits, either of which may be two-phase or three-phase as already fully explained.

The diagram which constitutes Fig. 3, represents the relative magnitude and phase relations of the various electrical and magnetic quantities involved in my transformers, illustrated in Figs. 1 and 2. For example, the voltage of the primary winding A B on leg $L^1$ in Fig. 1 is represented by the vertical line A B in Fig. 3. The voltage of the primary winding 1, 8 on leg $L^3$ is represented by the horizontal line 1, 8. The line A B is perpendicular to the line 1, 8 at its middle point to correspond to the fact that the primary winding A B is connected to the middle of the primary winding 1, 8 and the voltages of the two are in quadrature. The point F on the vertical line A B in Fig. 3 represents the tap connection at the point F in the primary winding. The point F is so located on the line A B that F B is 86.7 per cent. of A B in Fig. 3. Hence the lines joining the points 1, F, 8 form an equilateral triangle, indicating the fact that the voltage of the points 1, F and 8 of the primary windings are in the usual three-phase relation and may properly be connected to the supply lines of a three-phase system. The relation between the lines A, B and 1, 8 of Fig. 3 indicates also that the points A, B and 1, 8 of the primary windings may be connected respectively to a two-phase circuit. Similar relations exist with regard to the secondary windings. In Fig. 3 the line C D represents the voltage in the secondary winding C D in Fig. 1 and the line $a\ h$ represents the voltage in the secondary winding $a\ h$, the two being at right angles or in quadrature suitable to supply a two-phase system of distribution. In Fig. 3 K represents the tap connection to the secondary winding C D, which tap in combination with the secondary connecting points $a$ and $h$ may be connected to a three-phase distribution system in order to furnish three-phase currents thereto.

It cannot be indicated diagrammatically in Fig. 3, without undue complications, but it should be noted that one of the important features of my invention consists in the arrangement of coils 1 to 8 and $a$ to $h$ respectively. Coils A B and C D and the portion of the magnetic circuit that they embrace belong to one and the same phase, but the two halves of the windings 1 to 8 and $a$ to $h$ respectively belong to two different phases, when considering the three phase circuit; but they belong to one phase when considering the two phase circuit, while the magnetic flux carried by the leg $L^3$ or $L^8$ is common for both. In order to counteract the effect of unequal loads, the four quarters of the primary windings carried by the leg $L^3$ or $L^8$ are intermixed so as to get coils which belong to phase 1 M in Fig. 3 into reactive equilibrium with coils which belong to phase 8 M. A corresponding statement applies to coils $a$ to $h$.

By making my transformer with a tap connection to the primary winding A B at the point P in Fig. 3 it is possible to connect the points P, 1 and 8 respectively to an interconnected two-phase circuit requiring only three conductors, the point P being connected to the common conductor. This fact is shown in Fig. 3 because the dotted lines P 1 and P 8 are at right angles to each other. A similar connection may be made to the secondary winding of my transformer, if desired, in order to enable it to be connected to a three-wire, two-phase circuit.

A tap connection at the point Q in Fig. 3 may be led to a neutral or fourth conductor of a four-wire, three-phase circuit. This applies to either the primary or secondary winding of my transformer or to both. The three lines Q F, Q 1 and Q 8 being of equal length and being 120° apart, represent the fact that the point Q will be neutral with respect to the points F, 8 and 1 to which the three wires of a three-phase circuit may be connected.

In order to facilitate the ready understanding of my invention I have set it forth as it may be embodied in apparatus of simple form and construction. It is obvious, however, that the cores of transformers employed in carrying out my invention may be modified in form, proportions, etc. It is also evident that the various windings may be further subdivided and that they may be differently located or connected or tapped without departing from my claims provided the essential features are present.

I claim:—

1. In a polyphase transformer, the combination with a single core structure of a primary winding comprising two portions respectively wound on separate branches of said core structure one of which portions is connected to an intermediate point of the other, the former portion having a tap connection at a point giving substantially 87 per cent. of its voltage with respect to said intermediate point, and a similarly arranged secondary winding.

2. In a polyphase transformer the combination with a single core structure of a primary winding comprising two portions designed to give substantially equal voltages, and wound respectively on separate branches of said core structure, one of said portions having a tap connection at a point giving substantially 87 per cent. of its voltage with respect to one end, which end is connected to substantially the middle point of the other portion of said winding, and a similarly arranged secondary winding.

3. In a polyphase transformer, the combination with a single core structure of a primary winding consisting of two portions substantially the end of one of which is connected to approximately the middle point of the other, and being wound on separate branches of said core structure, each half of the latter portion of said winding being subdivided into at least two parts on opposite sides of said middle point, and a corresponding secondary winding.

Signed at East Orange, county of Essex, State of New Jersey, this 18th day of November, 1912.

ARMIN HENRY PIKLER.

Witnesses:
GEORGE K. KAISER,
A. M. FROST.

Copies of this patent may be obtained for five cents each, by addressing the "Commissioner of Patents, Washington, D. C."